(12) United States Patent
London

(10) Patent No.: US 6,457,720 B1
(45) Date of Patent: Oct. 1, 2002

(54) APPARATUS FOR APPLYING A SPLIT MECHANICAL SEAL TO A ROTATABLE SHAFT

(75) Inventor: Michael A. London, Clearwater, FL (US)

(73) Assignee: Utex Industries, Inc., Houston, TX (US)

( * ) Notice: Subject to any disclaimer, the term of this patent is extended or adjusted under 35 U.S.C. 154(b) by 0 days.

(21) Appl. No.: 09/656,190

(22) Filed: Sep. 6, 2000

(51) Int. Cl.[7] .................................................. F16J 15/34
(52) U.S. Cl. ....................................... 277/370; 277/374
(58) Field of Search ................................ 277/358, 370, 277/371, 374, 375

(56) References Cited

U.S. PATENT DOCUMENTS

| | | | |
|---|---|---|---|
| 4,576,384 A | | 3/1986 | Azibert |
| 4,576,384 C1 | | 6/1992 | Azibert |
| 5,370,401 A | | 12/1994 | Sandgren |
| 5,820,129 A | * | 10/1998 | Reagan |
| 5,961,122 A | | 10/1999 | Marsi |
| 6,068,263 A | * | 5/2000 | Azibert et al. |

OTHER PUBLICATIONS

Flier: "Chesterton 221 Split Seal," 6 pages. A. W. Chesterton Co., Stoneham, Massachusetts, 1990.
Flier: "Chesterton 442 Spilt Mechanical Seal," 4 pages. A. W. Chesterton Co., Stoneham, Massachusetts, 1994.
Flier: "The PSS Dura Seal," 4 pages. Durametallic Corporation, Kalamazoo, Michigan, 1990.
Flier: "Style 85 Split Cartridge Seal," 5 pages. Flex–A–Seal, Inc., Essex Junction, Vermont. Admitted prior art.
Flier: "Power Packing's New 1200S Split Seal," 2 pages. Power Packing Company, Inc., Baton Rouge, Louisiana. Admitted prior art.
Flier: "PPC's 2400S Split Double Seal," 4 pages. Power Packing Company, Inc., Baton Rouge, Louisiana. Admitted prior art.
Flier: "John Crane Type 3710 Cartridge Split Seal," 2 pages. John Crane Sealol, Cranston, Rhode Island, 1998.
Flier: "PPC's 1200S Split Seal," 4 pages. PPC Mechanical Seals, Baton Rouge, Louisiana. Admitted prior art.

* cited by examiner

Primary Examiner—Chuck Y. Mah
Assistant Examiner—John L. Beres
(74) Attorney, Agent, or Firm—Carlos A. Torres; Loren G. Helmreich; Browning Bushman, P.C.

(57) ABSTRACT

A shaft extending from a housing is rotatably sealed with the housing using a split seal assembly. During installation of the assembly, an alignment pin on one half of the assembly engages an oblong recess with planar sides in the other half of the assembly to permit radial movement of the two halves toward each other while preventing relative axial movement between the two halves. The permitted radial movement facilitates the assembly of the seal to the shaft while the limitation on relative axial movement maintains the correct positions, of the two halves. The permitted radial movement allows the two halves to assume fill circular engagement with the shaft to optimize the seal and the mechanical engagement with the shaft.

10 Claims, 4 Drawing Sheets

APPARATUS FOR APPLYING A SPLIT MECHANICAL SEAL TO A ROTATABLE SHAFT

CROSS-REFERENCE TO RELATED APPLICATIONS

This application is related to a non provisional patent application filed on the same date as the date of filing of this application, such related application being entitled "Split Mechanical Face Seal" naming as inventors Fred Pippert and John Nunn, and assigned to the same assignee as that of the present application.

BACKGROUND OF THE INVENTION

1. Field of the Invention

The present invention relates generally to the field of seals employed to effect a seal between a housing and a rotatable shaft extending from the housing. More particularly, the present invention relates to a method and apparatus for optimizing the sealing engagement between a split mechanical seal and a rotatable shaft.

2. Setting of the Invention

Many mechanical devices employ a rotatable shaft that extends from a housing containing structural devices immersed in, or contained within, liquids, gases and other materials. Examples are crankshafts extending from internal combustion engines, drive shafts extending from inboard motors to propellers, and process machinery in which blades or other rotating devices rotate within a mixing chamber. It is usually necessary to provide a seal between the shaft and housing of these devices to permit rotation of the shaft while simultaneously preventing the escape of materials contained within the housing.

Replacement or repair of the shaft seals is preferably done without disassembling the equipment secured to either end of the shaft. Split mechanical face seals are commonly employed for this purpose. The replacement seal is constructed in two parts that can be assembled around the shaft to replace the faulty seal. The normal procedure for applying a split mechanical seal to a shaft is to place each half of the seal around the shaft and bolt the two seal halves together. The replacement seal is then bolted to the housing to complete the seal between the housing and the shaft.

Split mechanical seals often include a large number of component parts which, to properly seal with the shaft, must align precisely when the two seal halves are brought together and bolted to each other. A common technique for facilitating the assembly of the two seal halves around a shaft is to employ one or more alignment pins that project rigidly from one seal half into a recess formed in the mating part of the other seal half. The alignment pins maintain axial alignment between the two halves as they are bolted together about the shaft.

Prior art arrangements for assembling the two halves of a split mechanical seal using alignment pins can prevent optimum sealing contact and optimum gripping between the mechanical seal and the shaft. The problem arises from the fact that the rigid alignment pin in one seal half does not precisely align axially with the recess in the mating seal half until the two halves are brought fully together to their design contact position about the shaft.

Before the two seal halves are brought fully together, the pin axis and the conventional circular recess axis are non coaxial. The recess dimensions in most prior art split seal designs are only marginally larger than the alignment pin dimensions. As a result, the alignment pin resists entering the alignment recess during the placement of the seal assembly about the shaft. Even after the alignment pin enters the receiving recess on the mating seal half, the misalignment of the axis of the alignment pin and that of the recess resist the tightening force imposed by the bolts clamping the two seal halves together. Resistance to tightening of the bolts can mistakenly be interpreted as complete and proper engagement of the two seal components which is required to obtain the maximum gripping force with the shaft and to form an optimum seal between the seal halves and the shaft.

It is understood that the binding problem associated with the movement of the alignment pin through the mating recess can be reduced by increasing the diameter of the recess, however, merely enlarging the recess diameter permits axial displacement between the two seal halves as they are being assembled. Axial alignment between the two seal halves as they are being bolted together is critical in ensuring an effective seal between the shaft and the housing and in obtaining a secure grip on the shaft.

From the foregoing it may be appreciated that a primary object of the present invention is to provide an alignment method and apparatus that permits axial alignment between the two mating halves of a split mechanical seal that is effective during the initial and final placement of the seal about a shaft.

Another object of the present invention is to provide an alignment arrangement in a split mechanical seal that allows the two components of the seal to freely move radially toward each other while maintaining a fixed relative axial position between the two halves.

A related object of the present invention is to provide a low-cost, efficient apparatus and method for assembling a split mechanical seal about a shaft whereby the two components of the seal may be secured to each other in a position achieving an optimum seal with the shaft.

An important object of the present invention is to provide an alignment technique in which the alignment pin of one part of a split mechanical seal can be quickly and easily aligned with a mating recess in the second part of the seal without requiring axial alignment between the pin and recess.

SUMMARY OF THE INVENTION

The alignment recesses in one half of a split mechanical seal are provided with circumferentially extending, linear sidewalls that closely engage the sides of an alignment pin extending rigidly from a second-half of the mechanical seal. The alignment pin is free to move radially within the recess between the linear sidewalls as the two halves of the split seal close radially together. The contact between the sides of the alignment pin and the sidewalls of the recess at the final closing point ensures a fixed, correct axial relationship between the two halves of the seal.

The provision of an alignment recess that permits radial movement and limits axial movement facilitates the assembly of the two split halves about a shaft. The initial entry of the end of the alignment pin into the recess is simplified as compared with the prior art technique requiring precise alignment of the pin with the recess before closing radial movement between the two seal halves could be achieved.

The alignment method and apparatus of the present invention prevents the faulty assembly of split mechanical seals about a shaft caused by the binding encountered in conventional alignment systems.

The described features, objects and advantages of the present invention will be more filly understood and better appreciated by reference to the following drawings, specification and claims.

DESCRIPTION OF THE ILLUSTRATED EMBODIMENTS

Figure 1:
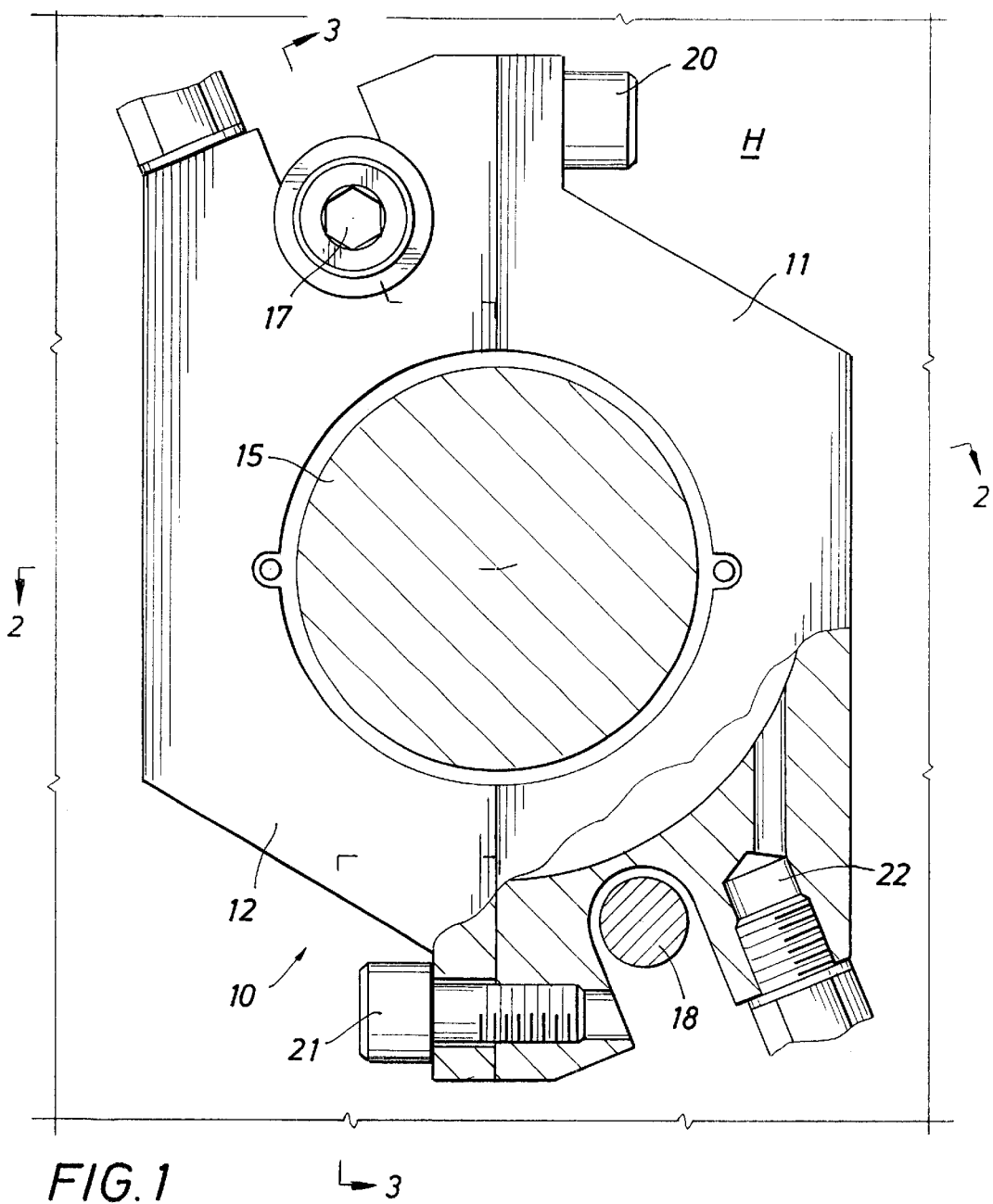
FIG. 1 of the drawings is a front elevation, partially in cross section and partially broken away, illustrating a split mechanical seal of the present invention positioned about a shaft extending from a housing.

The split mechanical seal of the present invention is indicated generally at 10 in FIG. 1. The seal 10 is comprised of a first gland half 11 secured to a second gland half 12. The two gland halves are provided with split sealing elements forming a composite rotary seal that encircles and seals against a rotatable shaft 15 extending from a housing H. The split mechanical seal 10 provides a seal between the rotatable shaft 15 and the housing H.

Bolts 17 and 18 secure the seal 10 to the housing H. Bolts 20 and 21 secure the stationary portions of the two gland halves to each other. A seal lubrication port 22 conducts lubricant to the internal sealing components within the split seal 10.

Figure 2:
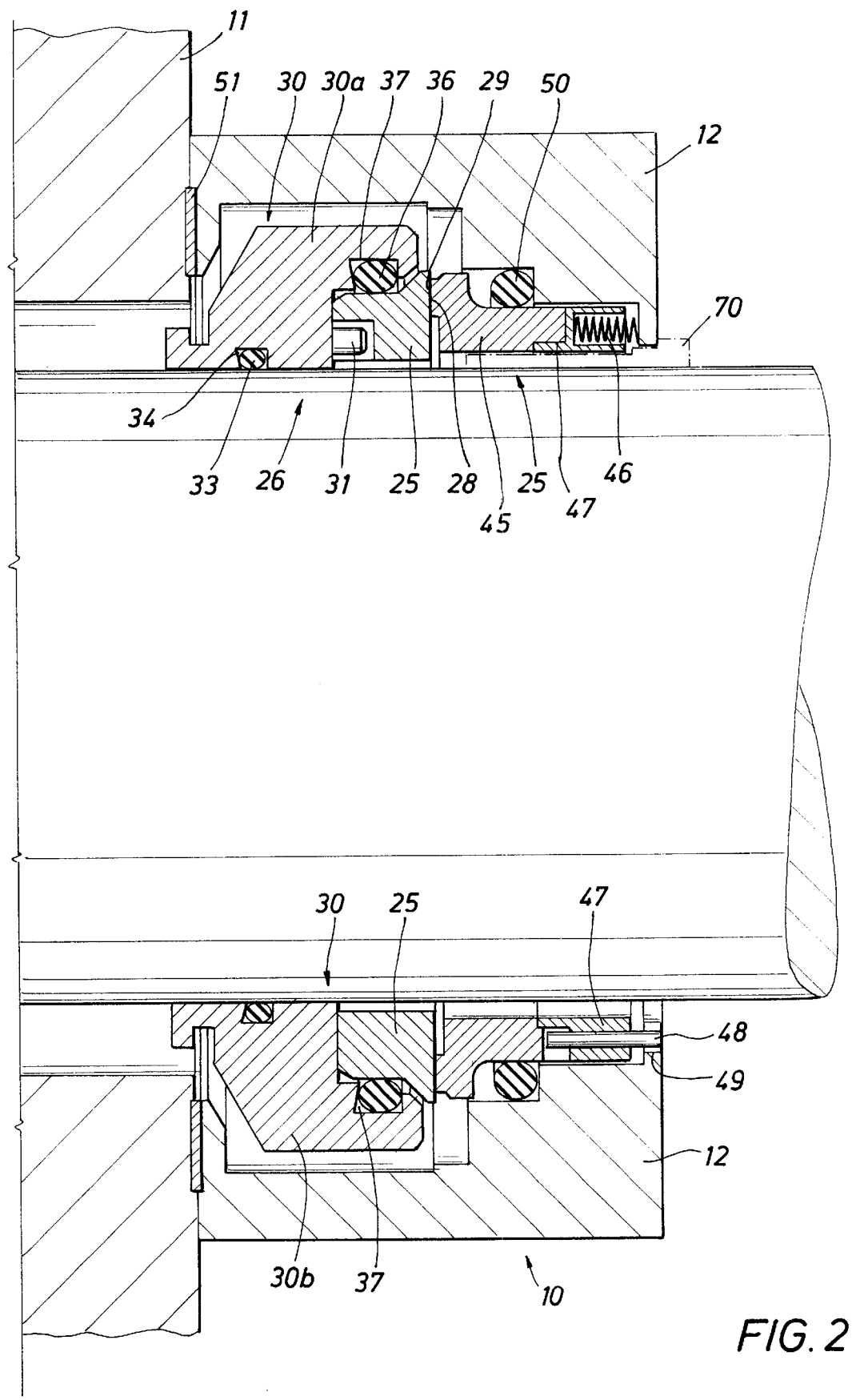
FIG. 2 is a side elevation, partially in cross section taken along two intersecting planes indicated by the line path 2—2 of FIG. 1 illustrating details in the construction and operation of the seal components of the present invention.
Figure 3:
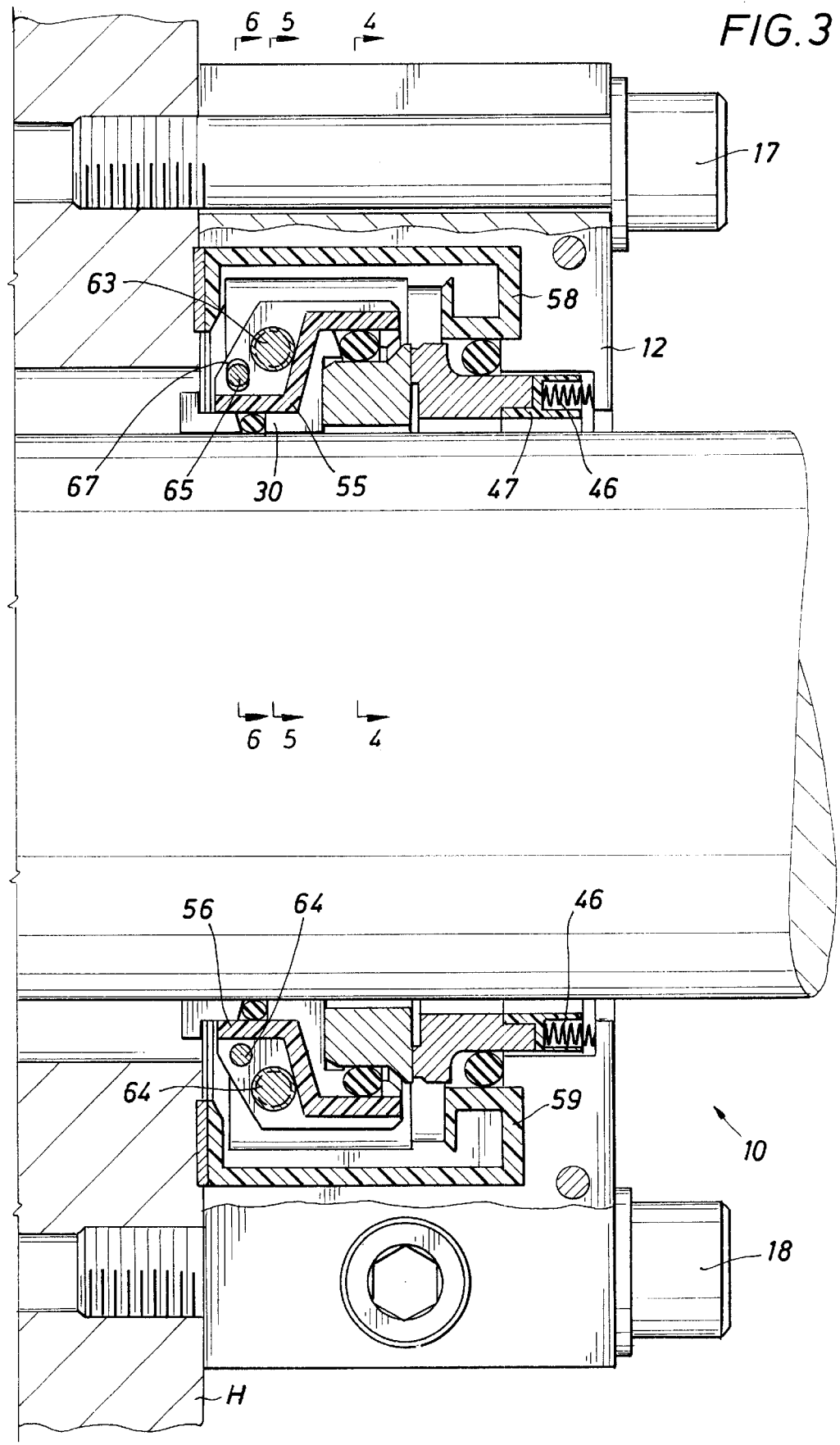
FIG. 3 is a side elevation, partially in cross section taken along five intersecting planes indicated by the line path 3—3 of FIG. 1.

As may best be seen by joint reference to FIGS. 2 and 3, the seal 10 is comprised of two relatively movable sealing components, a composite stationary face seal, one half of which is indicated generally at 25 and a composite rotary face seal, one half of which is indicated generally at 26. The sealing contact between the rotary and stationary components is provided between a composite rotary seal face 28 formed on the rotary portion of the seal and a composite stationary seal face 29 formed on the stationary portion of the seal.

The rotating components of the seal are provided, in part, by a two-piece rotary body indicated generally at 30, comprised of rotary body half 30a and a rotary body half 30b clamped to the shaft 15. A drive pin 31 transfers rotary motion of the rotary body 30 to the rotary face seal 25. A leak proof seal is provided between the rotary body 30 and the shaft 15 by an annular, elastomeric, butt-cut O-ring seal 33 carried in an annular groove 34 in the composite rotary body 30. The construction of the rotating seal 26 is completed with a larger, elastomeric, butt-cut O-ring seal 36 carried within a groove 37 in the rotating body 30. The O-ring seal 36 provides a seal between the rotary face seal 25 and the composite rotary body 30.

Figure 7:
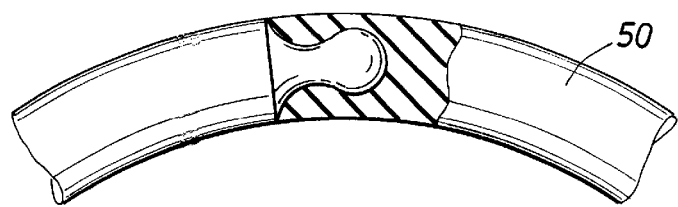
FIG. 7 is a partial, broken away view illustrating an end connection for an O-ring employed in the seal of the present invention.

The stationery components of the seal 10 are provided, in part, by the stationary gland halves 11 and 12 secured with the bolts 17 and 18. Within the gland halves, a composite stationary face seal 45 is urged axially against the rotary face seals 25 by multiple coil springs 46 carried within a butt-cut spring retainer 47. The retainer 47 may be machined Teflon or may be any suitably formed material that will hold the springs in place during assembly. The material and shape of the retainer must be such that the coil springs 46 are held in place as the retainer is opened at its cut ends sufficiently to permit the retainer to slip over the shaft. The retainer material is also preferably sufficiently resilient to substantially resume its circular form once it has been positioned about the shaft 15. Indexing pins 48 extending through index openings 49 in the gland halves fix the circumferential position of the spring retainer 47. An elastomeric, ball and socket O-ring seal 50 provides a seal between the gland halves 11 and 12 and the stationary face half 45. As best illustrated in FIG. 7, the seal 50 is formed by a single cylindrical section of material that is provided at its end with a ball and socket connection. The seal 50 may be positioned about the shaft and its ends connected with the ball and socket connection to form a continuous O-ring. The stationary seal is completed with a two-part annular gland gasket 51 positioned between the gland halves and the housing H. The gasket 51 is preferably formed as two semi circular sections that may be individually positioned in each gland half to form a complete, circular seal against the housing when the two gland halves are secured together.

As thus far described, it may be appreciated that the rotating face seal 26 provides a seal between the shaft and the rotary seal face 28 while the stationary face seal 25 provides a seal between the stationary seal face 29 and the housing H. The seal between the faces 28 and 29 is a sliding seal that is maintained by the spring biased engagement of the two planar sealing faces.

Referring to FIG. 3, the circumferential end face of the semicircular rotating face seal 26 is sealed against its mating semicircular rotating face seal with rotary and gaskets 55 and 56. The end gaskets 55 and 56 are received in Z-shaped grooves formed in the end faces of each rotating face half segment. The gaskets 55 and 56, which may be constructed of a synthetic elastomeric material, rubber or other suitable material, prevent leakage through the abutting end faces of the individual rotating face halves forming the rotating seal.

Figure 4:
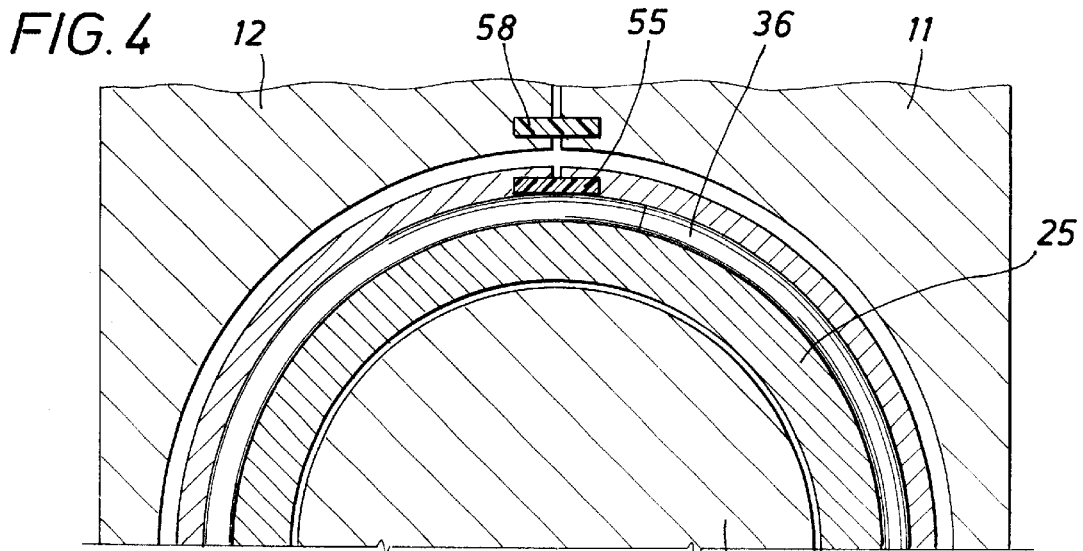
FIG. 4 is a partial cross sectional view taken along the line 4—4 of FIG. 3.
Figure 5:
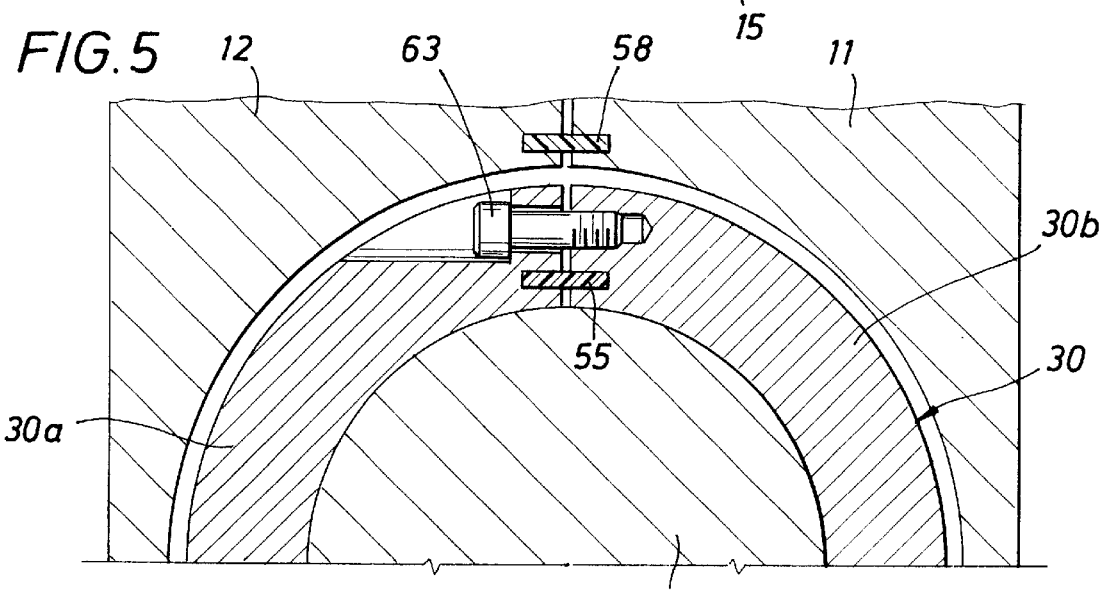
FIG. 5 is a partial cross sectional view taken along the line 5—5 of FIG. 3.

As may best be seen by joint reference to FIGS. 3, 4 and 5, two gland end gaskets 58 and 59 are positioned in the ends of the two gland halves 11 and 12 to seal the adjoining end faces between the two gland halves. The gaskets 58 and 59 may be constructed of a synthetic, elastomeric material, rubber or other suitable gasket material.

Figure 6:
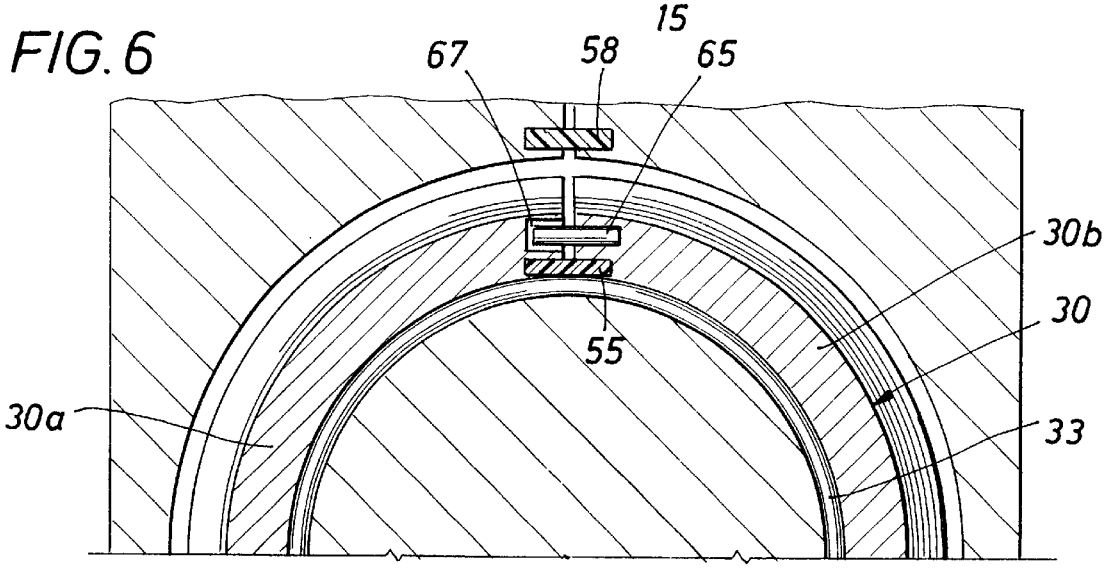
FIG. 6 is a partial, cross sectional view taken along the line 6—6 of FIG. 3.

Bolts 61 and 63 extend through the two halves 30a and 30b of the rotary body 30 to clamp them about the shaft 15. An alignment pin 64 expands rigidly from the circumferential end of the rotary body half 30a and extends into an alignment recess (not illustrated in the view of FIG. 3) formed in the mating circumferential end surface of the second rotary body half 30b. A similar, rigidly affixed alignment pin 65 extends from the opposite end of the rotary body half 30b. As may be best seen by reference to FIGS. 3 and 6, the pin 65 extends into an alignment recess 67 formed in the circumferential end of the rotary body half 30a holding the alignment pin 64.

The alignment recess 67 and its corresponding recess (not illustrated) on the mating rotary body half 30b is provided with planar, non curving sidewalls that permit radial movement of the two rotary body halves relative to each other but prevent relative axial movement of the two body halves. When the rotating seal assembly 26 is being secured to the shaft 15, the two halves of the rotating assembly are positioned about the shaft and the alignment pins 64 and 65 are easily received within the elongated recesses, such as the recess 67, formed in the mating circumferential end faces of the two rotating assembly halves 30a and 30b. Tightening the bolts 61 and 63 brings the two halves of the rotary body 30 together without encountering resistance from the radial movement of the alignment pins into or through the elongated recesses. The result is that the rotating body 30 may be tightly clamped about the shaft 15 in a perfectly circular engagement that precludes leakage between the rotary body and the shaft.

In the installation and assembly of the split mechanical seal 10, the O-ring 33 and the gaskets 55 and 56 are lubricated and the O-ring 33 is positioned into the groove 34. The cut of the butt-cut O-ring is positioned away from the intersection of the two rotary body halves. The rotary end gaskets 55 and 56 are inserted into the provided grooves at the ends of the rotary body halves 30a and 30b. The rotary body half 30a is then positioned around the bottom side of the shaft 15 and the second rotary body half 30b is placed in mating position with the half 30a over the top of the shaft. During this portion of the assembly process, the two alignment pins 64 and 65 are received within their respective recesses and are permitted to move radially relative to the shaft but are prevented from moving axially relative to each other. The two rotary body halves 30a and 30b are bolted together with the bolts 61 and 63 until the assembly is loosely held about the shaft.

The loosely assembled rotary body 30 is moved up against the housing H to a position determined with a spacer (not illustrated) that has the thickness required to properly space the body 30 relative to the face of the housing H. The bolts 61 and 63 are tightened securely to clamp the body 30 to the shaft and to seal the body with the shaft.

The O-ring 36 is then lubricated and installed into the O-ring groove 37 of the rotary body 30 where the rotary face 25 is to be located. The rotary face 25 is installed with a face installer (not illustrated).

The ball and socket O-ring 50 is lubricated and assembled around the shaft 15. The two halves of the stationary face 45 are held together around the shaft and the O-ring 50 is placed about the two halves to hold the components together. The spring retainer 47 is opened at its cut ends and positioned around the shaft 15. With the retainer 47 in a circular configuration bout the shaft, the retainer 47 is pushed axially along to the shaft until it is mated with the end of the stationary face 45. A temporary, butt-cut setting spacer 70 is opened at its cut end, positioned over the shaft 15, returned to its circular state and then moved axially into the position illustrated in FIG. 2. The setting spacer 70, which may be constructed of Teflon or other suitable material, is used temporarily to properly position the stationary face 45 and retainer 47 during assembly of the seal 10.

The gland gaskets 55 and 56 are lubricated and inserted into the gland halves 11 and 12. The gland half 11 is then positioned over the top of the rotary and stationery assemblies with the alignment pin 48 in the gland slot 49. The gland half 12 is then installed under the gland half 11 and the two halves are loosely secured together around the shaft with the bolts 20 and 21. The gland assembly halves are then aligned and the bolts 17 and 18 are employed to loosely secure the assembly to the housing H. The Bolts 20 and 21 are then tightened as required to seal the two gland halves 11 and 12 together and the bolts 17 and 18 are tightened to secure the assembly to the housing H. The setting spacer 70 is then removed from around the shaft 15.

While a preferred form of the invention has been described in detail herein, it will be appreciated that many variations may be made without departing from the spirit and scope of the invention which is more fully defined in the following claims.

What is claimed is:

1. A split seal assembly comprising, first and second axially extending seal housing sections adapted to be secured together to form a seal housing to encircle a coaxially extending rotatable shaft, first and second stationary seal assembly sections adapted to be non rotatably contained within said seal housing and to form a seal with said seal housing, first and second rotatable seal assembly sections adapted to be secured to and rotated with a rotatable shaft to form a seal between a shaft and said stationary seal assembly, a securing assembly connecting said first and second rotatable sections together for moving said first and second rotatable sections radially together for non-rotating engagement with a shaft, and an alignment member for restraining axial movement and permitting a radial movement of said first and second rotatable sections relative to each other while said securing assembly is moving said first and second rotatable sections radially together.

2. A split seal assembly as defined in claim 1 wherein said alignment member comprises an alignment pin movable in a recess wherein said recess includes at least two planar sidewalls for restricting axial movement between said pin and said recess while permitting relative radial movement between said pin and said recess.

3. A split seal assembly as defined in claim 2, wherein said recess includes parallel planar sidewalls.

4. A split seal assembly as defined in claim 2, wherein said pin is cylindrical in shape and has a diameter that simultaneously contacts said two planar sidewalls as said pin is moved radially through said recess.

5. A split seal assembly as defined in claim 1, wherein said alignment member comprises alignment pins extending from two abutting faces of said first and second rotatable sections into mating recesses formed in said two abutting faces.

6. A split seal assembly as defined in claim 5, wherein said recesses each include at least two planar sidewalls for restricting axial movement between said pins and said mating recesses.

7. A split seal assembly as defined in claim 6, wherein said planar sidewalls include parallel planar sidewalls.

8. A split seal assembly as defined in claim 3, wherein said pin is cylindrical in shape and has a diameter that simultaneously contacts said two planar sidewalls as said pin is moved radially through said recess.

9. A split seal assembly as defined in claim 8, wherein said alignment member comprises alignment pins extending from two abutting faces of said first and second rotatable sections into mating recesses formed in said two abutting faces.

10. A split seal assembly as defined in claim 1, wherein said alignment member comprises alignment pins extending from two abutting faces of said first and second rotatable sections into mating recesses formed in said two abutting faces.

* * * * *